Dec. 30, 1930. E. J. MADDEN 1,786,856
VEHICLE BRAKE
Filed Oct. 13, 1926  4 Sheets-Sheet 3
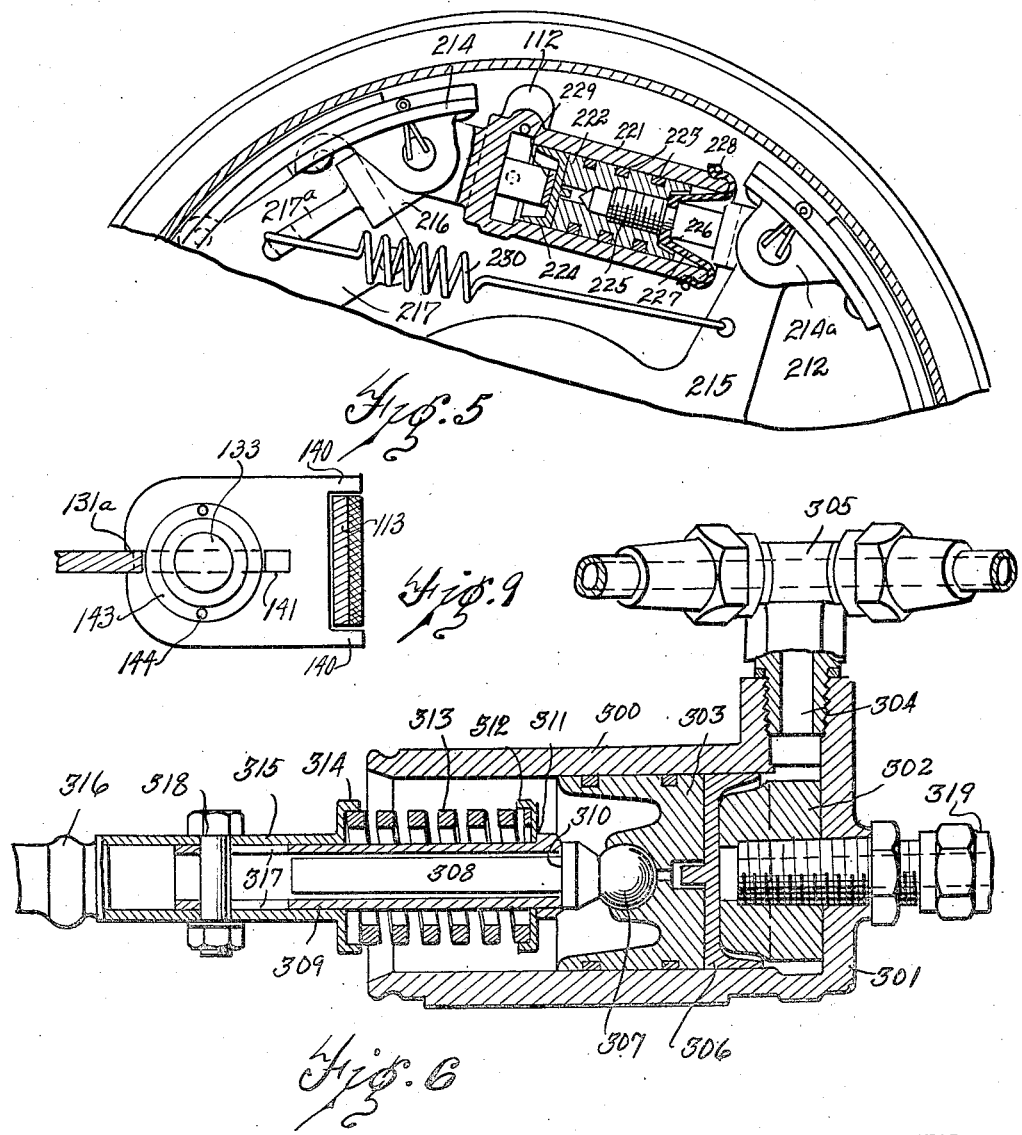
INVENTOR.
Edward J. Madden
BY
Francis D. Hardesty
ATTORNEY.

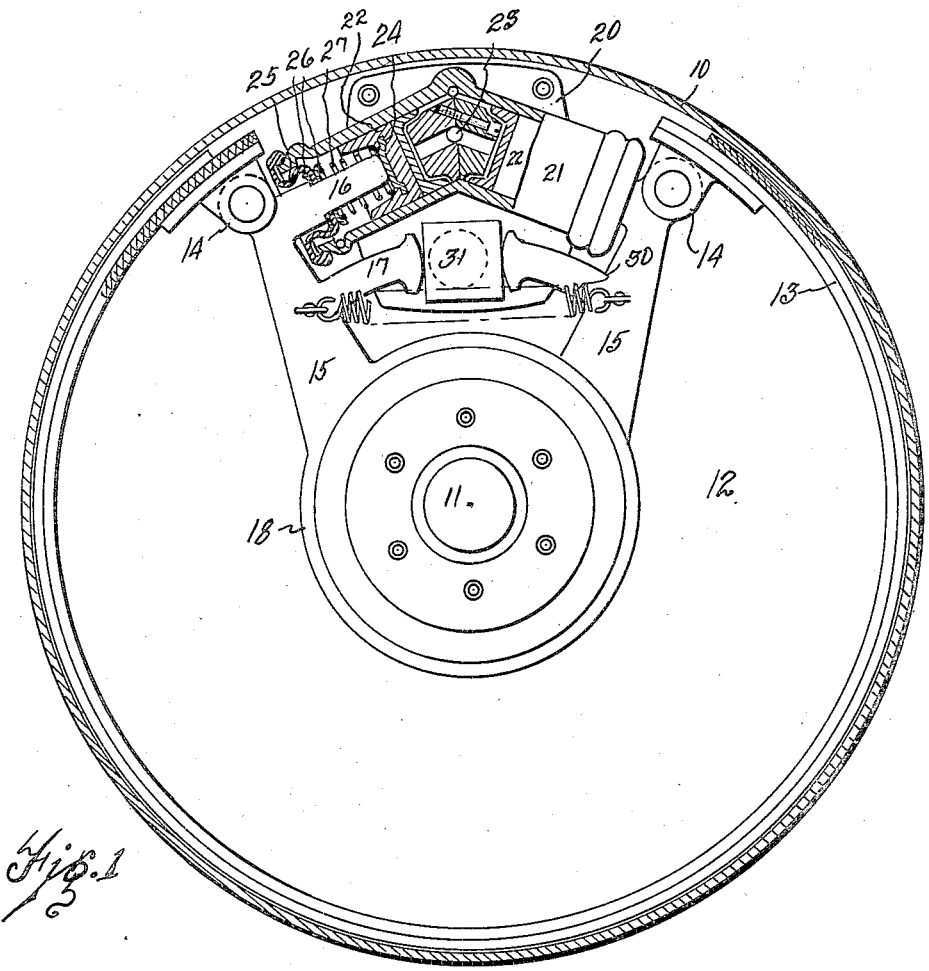
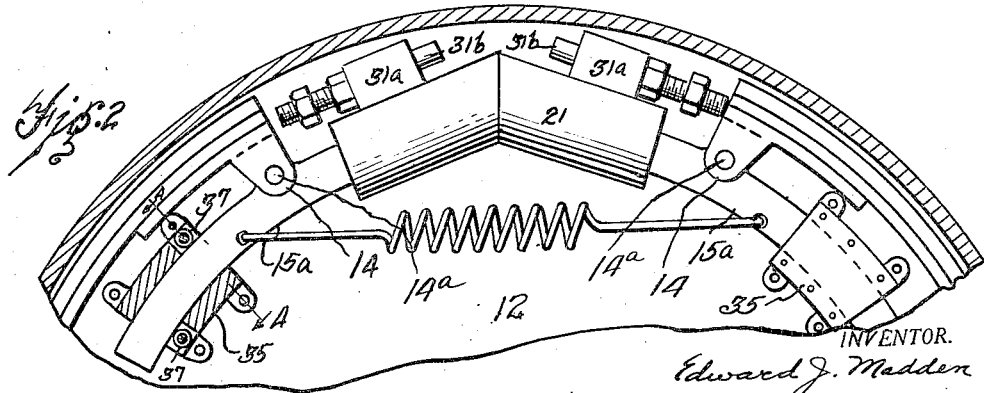
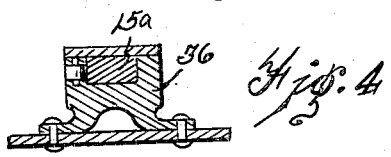

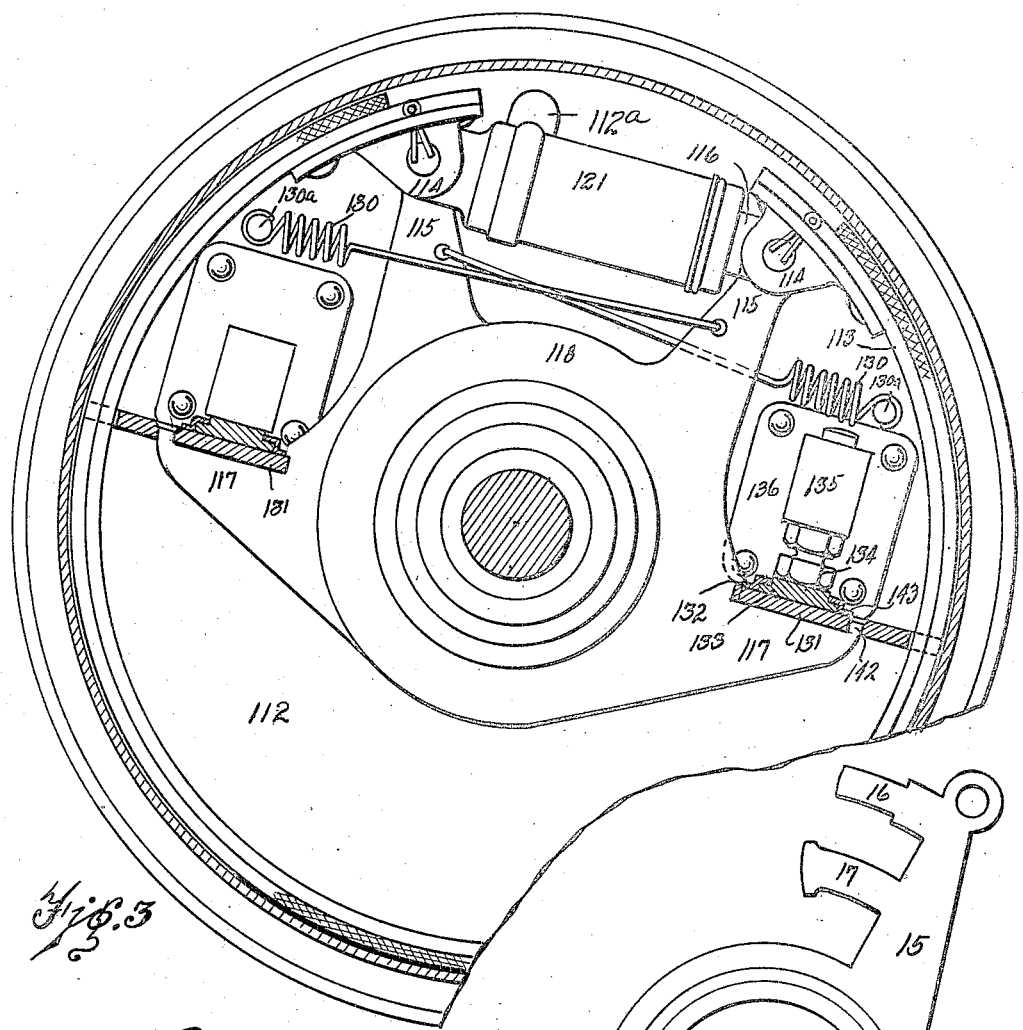

Dec. 30, 1930.  E. J. MADDEN  1,786,856
VEHICLE BRAKE
Filed Oct. 13, 1926    4 Sheets-Sheet 4

INVENTOR.
Edward J. Madden
BY
Francis D. Hardesty
ATTORNEY.

Patented Dec. 30, 1930

1,786,856

UNITED STATES PATENT OFFICE

EDWARD J. MADDEN, OF DETROIT, MICHIGAN

VEHICLE BRAKE

Application filed October 13, 1926. Serial No. 141,258.

The present invention relates to brakes and more particularly to brakes for automotive vehicles.

Among the objects of the invention is a brake in which the braking action is assisted by the movement of the moving brake surface.

Another object is a brake of the type mentioned in which the braking is assisted irrespective of the direction of movement.

Another object is a brake in which the wear will be more uniformly distributed over the braking surface and therefore greatly reduced.

Yet another object is the improvement of the distribution means for distributing the fluid under pressure to the brakes on the several wheels.

Still other objects include novel means for supporting and adjusting the brake bands whereby the other objects may be accomplished and also novel means for actuating brakes of the type indicated.

With these and other objects in view, as will more clearly hereinafter appear, the invention in its preferred forms comprises broadly a brake drum mounted on the moving part and a brake band mounted on the stationary part and in such fashion that its ends may be moved circumferentially a limited distance without radial movement while the rest of the band is free to move radially as well as circumferentially, together with the mounting and actuating means.

Reference should be made to the accompanying drawings in which:

Fig. 1 is a view in elevation of one form of the brake from the wheel-side and with the drum in section;

Fig. 2 is a view in elevation with parts in section showing a somewhat modified form of brake;

Fig. 3 is a similar view of another modification;

Fig. 4 is a section on line 4—4 of Fig. 2;

Fig. 5 is a vertical section through the brake cylinder and showing still another modification;

Fig. 6 is a vertical longitudinal section through the main pressure cylinder;

Fig. 7 is a section through a form of pressure governing device;

Fig. 8 is a detail view of one of the parts of Fig. 1;

Fig. 9 is a detail view in plan of one of the parts shown in Fig. 3.

Figure 10:
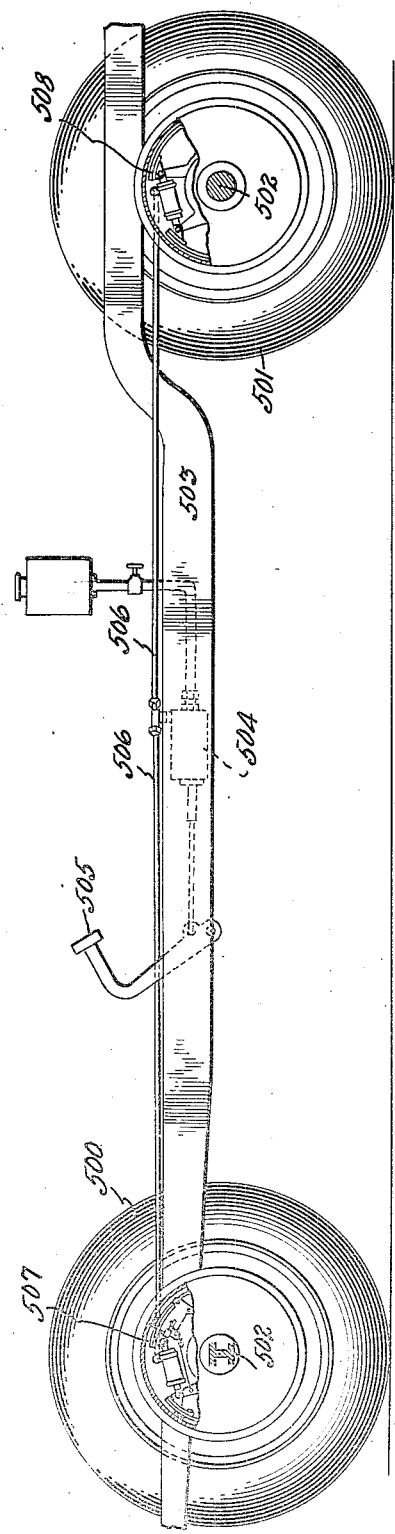
Fig. 10 is a more or less diagrammatic illustration of a vehicle chassis with a brake system embodying a feature of the invention.

Referring to Fig. 1, the brake comprises a drum 10 of conventional design secured in the usual manner to a wheel of a vehicle mounted on an axle 11. To the axle housing, or, in the case of dead axles, to the axle itself, is a plate or disc 12 carrying the brake mechanism and brake band, the latter being indicated at 13.

Each end of the brake band is provided with a lug 14 by means of which it may be pivotally secured to a supporting arm 15. The arms 15 may be identical but are arranged as right and left as shown. Each arm 15 is provided with two laterally projecting arms 16 and 17, the former near the end of arm 15 and the latter at an intermediate location. Also, arms 15 constitute radially projecting portions of centrally arranged rings 18 which are rotatably mounted on and concentrically with the axle housing or axle, so that the arms 15 fix the distance between the ends of the brake band and the center of the axle. These parts are best shown in Fig. 8.

Supported on a bracket 20 secured to disc 12 is a double cylinder 21 containing two pistons 22. This double cylinder preferably has its two end portions arranged at an angle to each other and at such an angle that the cylinder lies approximately on an arc concentric with the drum 10 and is provided with an inlet 23 at its central portion for pressure fluid.

The pistons 22 are provided on the underside of their heads with hardened plates 24 adapted to press against the ends of arms 16 on parts 15 and the lower ends of the cylinder are closed by diaphragms of flexible material 25 extending over the edges of the cylinder and surrounding arms 16. The diaphragms 25 are held on arms 16 between two discs or washers 26 which are pressed against shoulders on the arms 16 by springs 27 acting between the inner washer and the underside of piston 22. The forcing in of fluid under pressure through inlet 23 pushes apart the pistons in a direction approximately circumferentially and through arms 16 and 15 moves the ends of the brake band circumferentially away from each other thus applying the brake to the drum.

The brake is returned to "off" position, when the fluid pressure is released; by means of a spring 30 connecting arms 15 and the movement of the arms toward each other is limited by the ends of the arms 17 striking an abutment 31. In the form shown, the abutment 31 is a square block on the end of a shaft mounted in disc 12 so that it may be rotated. Angular movement of the block 31 provides an adjustment to vary the distance between arms 17 in rest position. This form of adjustment is more fully described and shown in my prior application Serial No. 75,695 filed December 16, 1925 of which this application is a continuation of the former as to all matter common to the two applications.

Fig. 2 shows a modification of the above described structure. In this form of brake, the cylinders and pistons may be the same in form and function but the means for maintaining the radial distance between the brake band ends and the center of the axle is of a different form. In this modification the cylinder is shown at 21 in elevation and is mounted on a disc 12 as in the preceding form. The means for maintaining the radial distance of the ends of the brake band from the center of the drum and axle consists of two arc-shaped, preferably rectangular section, rods 15a arranged concentric to the drum and to which the brake band lugs 14 are pivoted as at 14a. These rods 15a are actuated longitudinally by the pistons in cylinder 21 and maintained in circumferential paths by guides 35. Guides 35 consist of members secured to disc 12 and channeled to accommodate the rods 15a. These guides preferably also carry rollers 37 serving to decrease friction between these relatively moving parts. Adjustable stops are also provided by the pins 31b threaded into lugs 31a on cylinder 21. These pins are adjusted to furnish abutments for the ends of the brake band on its return by means of the usual spring.

In the form of brake shown in Fig. 3, the elements are substantially the same in function as in Fig. 1 although differing in form. In this figure, the ends of the brake band 113 carry lugs 114 pivoted to the ends of arms 115 which extend substantially radially from the ring like body portions 118. Also pivoted to lugs 114 and supported thereby is the cylinder 121 and its piston and piston rod, the latter being indicated at 116. As the cylinder 121 and coacting parts are floating, the fluid inlet and supply parts will pass through the anchor plate 112 through openings 112a sufficiently large to permit a limited lateral movement. Instead of a single return spring, as in Fig. 1, two springs 130 are used in this form, each being secured to an arm 115 and anchored at its other end to plate 112 as at 130a.

In this form a somewhat different adjustable stop for the brake band is also shown. Each of the body portions 118 of the band end supports is provided with a second arm 117 which is shaped at its end portion to form a seat for a plate 131. This plate 131 is shown in plan in Fig. 9, is provided with a notch 131a at one end, fingers 140 at its other end, and an opening 141 in its body portion. The notch embraces the metal of arm 117 which, at the inner end of the seat mentioned, is also correspondingly notched to provide an interlock with the plate 131 at 132. A projecting tongue 142 on the end of arm 117 extends through opening 141 in the plate and is riveted over to fix the plate on the seat. The fingers 140 extend to the sides of the brake band 113 and prevent lateral motion thereof. On the upper face of plate 131 is fixed a flanged ring 143 secured thereto in any suitable manner as by screws 144 and within this ring, retained by the flange thereof is a hardened steel plate or button 133. This button is provided to coact with the head 134 of a stud threaded into a lug 135 formed upon a flanged base 136 adapted to be riveted to plate 112. The other band end support is also provided with similar parts except that the stud 134 may be omitted and the button 133 allowed to abut the end of lug 135.

Fig. 5 shows yet another form of brake similar to that of Fig. 3 except that in this case one end 214 of the brake band is anchored to anchor plate 212, while the other end is free to move circumferentially. The free end 214a is pivoted to an arm 215 substantially the same in form as arm 115 in Fig. 3 and its associated parts. The anchored end 214 is pivoted to a lug 216 formed as a part of a plate 217 which is secured to plate 212. Lug 216 also is provided with a rearward extension 217a furnishing an anchorage for spring 230 connected to arm 215 for returning the brake to "off" position.

In this figure is shown a longitudinal section of the brake cylinder 221 which cylinder is like cylinder 121 of Fig. 3. As shown, the cylinder is closed at one end into which leads the pressure fluid inlet. In cylinder 221 is fitted the piston 222 provided with rings 223 and a flanged disc 224 of flexible material at its front end. The rear end is bored axially and threaded to receive the piston rod 225 which is provided with a shoulder 226 adapted to press tightly between itself and the body of the piston the edge of a flexible diaphragm 227 surrounding the rod 225 and extending over the outer edge of cylinder 221 where it is held tightly in a groove by means of a ring 228. The outer end of rod 225 is pivoted to the end 214a of the brake band. The fluid chamber of cylinder 221 preferably has fixed in it a stop member 229 to limit the inward movement of the piston. This consists of a strip of metal bent to U-shape and of such a size as to stop the piston before the disc 224 moves far enough to interfere with the inflowing fluid.

In Fig. 6 is shown a form of main pressure cylinder or master cylinder and co-operating parts found especially suitable for the present brakes. In this figure, the cylinder 300 is shown as closed at one end 301 and inside of the closed end is shown as provided with an undercut portion enlarging the fluid chamber and providing an annular passage around a plug 302 placed in the chamber for the purpose of displacement and to act as a stop for piston 303. At one side, or as shown, at the top, of the chamber is a fluid passage 304 to which is connected a manifold 305 having branches leading to the several brakes.

The piston for cylinder 300 is shown at 303 as provided with a flexible cup 306 of leather or other suitable material secured to its forward end and has a socket in the rear side for a ball 307 formed on the end of the piston rod 308. The latter extends into a tube 309 and has a shoulder 310 back of ball 307 adapted to take the thrust of tube 309. The tube 309 is also provided with a shoulder 311 at its forward end against which rests a metal cupped washer 312 serving as a seat for spring 313 whose other end is seated in a cupped flange 314 formed on the end of a second tube 315 into which tube 309 telescopes. Tube 315 forms an extension of rod or tube 316 connected to the brake pedal of the vehicle. Tube 309 is adapted to slide freely in tube 315 and is provided near its rear end with slots 317 through which extends a bolt 318 secured in the walls of tube 315. By this construction flexibility of pedal movement is provided, the pressure upon the pedal being transmitted to the fluid in cylinder 300 through the spring 313 until the latter has been completely compressed. The tube 319 leads from the fluid reserve tank and is normally closed by a valve.

Fig. 7 shows an alternative means for obtaining the pedal flexibility. In this means, a small cylinder 400, closed at one end 401 to provide a fluid chamber is connected in one of the pressure lines, the pressure fluid passing into the cylinder, for example, through pipe 402 and out through 403. The other end 404 is closed by a screw plug 405 through which passes a tube 406. In the cylinder 400 is a piston 407 having on both sides thereof the cups 408 of leather or other suitable material, and in the fluid chamber at end 401 is a suitable stop 409. Tube 406 will be provided with a valve 410 through which air is pumped into the end 404 of the cylinder until the required pressure is attained and thereby furnishes an air spring controlled pressure relief for the fluid in the pressure line 402—403.

It will be noted that, in the forms of brakes shown in Figs. 1, 2 and 3, when the band is expanded to contact with the drum, the entire band may be carried around with the drum in either direction of movement of the latter until one stop strikes its stationary abutment. In any of these forms therefore the movement of the drum in either direction will assist in or accentuate the braking action in that it tends to carry the free end with it and thereby tends to increase the expansion of the band, thus pressing it tighter against the drum.

In the form of brake shown in Fig. 5, however, one end of the band is fixed to the anchor plate and the accentuation of the braking action is accomplished only in one direction, that is, when the drum, Fig. 5 is moving in a clockwise direction.

In making installations of fluid pressure brakes on the four wheels of an automobile it has been discovered that it is desirable to so arrange them that under no circumstances will the steering wheels become locked upon application of the brakes. With equalized brakes it is difficult, if not impossible, to lock the front wheels of an automobile when traveling forward because of the fact that when retarding the vehicle its weight shifts, in effect, forward and more pressure is exerted on the wheel tread thereby tending to maintain it in rotation. On the other hand, in traveling backwards and retarding, the weight shifts away from the front wheels and they readily lock with a resultant loss of steering control.

Therefore, in installing the present brakes it is preferred to use one of the first three forms of brake (Figs. 1, 2 or 3) on the rear wheels and the form on the front wheels and arrange the latter so that its self braking tendency will be exerted only on forward movement of the vehicle, that is, to arrange it as in Fig. 5 with the drum moving in a clockwise direction when the vehicle is moving forward.

Fig. 10, shows more or less diagrammatically the chassis of an automobile equipped with brakes embodying one feature mentioned herein, namely, the feature of self-braking of all wheels when the vehicle is moving forward and the elimination of the selfbraking on the front or steering wheels when the vehicle is moving backward. In this figure, the driving or rear wheels are indicated at 501 and the front or steering wheels at 500 with their axles at 502. The vehicle frame 503 carries the master brake cylinder 504 actuated by the pedal 505 and having conduits 506 leading to the front brakes 507 and rear brakes 508. The front brakes 507 are indicated as preferably of the type shown in Fig. 5 while the rear brakes 508 are shown as preferably of the type shown in Fig. 3.

Having now described the invention and the preferred forms of embodiment thereof it is to be understood that said invention is not to be limited to the precise details herein set forth and illustrated but only by the scope of the claims which follow.

I claim:—

1. A vehicle brake comprising a drum having a brake band therein adapted to be expanded against the drum, means for supporting said band and fixing the radial distance of the ends of the band from the center of the drum, fluid pressure means for forcing apart the ends of the band, and means for limiting circumferential movement of the band.

2. A vehicle brake comprising a stationary plate, a drum having a brake band therein adapted to be expanded against the drum, means for supporting said band and fixing the radial distance of the ends of the band from the center of the drum, said means comprising an arm having pivoted thereon the end of band and movable around the center of the drum, a second arm integral with the first and provided with a portion adapted to coact with an abutment adjustably fixed to the stationary plate to limit the return movement of the band, and fluid pressure means for forcing apart the ends of said band to thereby expand said band.

3. In an internal expanding brake having a flexible brake band, means for supporting the band comprising a member having a body portion concentric with and rotatable around the center of the brake assembly, an integral arm extending substantially radially from said body portion and having as its end means whereby an end of the band may be pivotally secured thereto, and a second arm integral with said body portion and adapted to coact with a stationary abutment to limit the circumferential movement of said supporting means.

4. In an internal expanding brake having a flexible brake band, means for supporting the band comprising a member having a body portion concentric with and rotatable around the center of the brake assembly, an integral arm extending substantially radially from said body portion and having at its end means whereby an end of the band may be pivotally secured thereto, and a second integral arm extending radially from said body portion and carrying a plate adapted to coact with a stationary abutment to limit the circumferential movement of said band and also provided with means to prevent lateral movement of said band.

5. In a fluid pressure brake, a fixed plate, a brake drum, a brake band and actuating means therefor including a fluid pressure cylinder and piston, means for supporting said band and actuating means within said drum, said supporting means including parts adapted to move around the center of the drum, and means carried by said plate for limiting the movement of the supporting means and parts.

EDWARD J. MADDEN.